(12) United States Patent
Troesser

(10) Patent No.: US 10,752,452 B1
(45) Date of Patent: Aug. 25, 2020

(54) DIMENSIONAL LUMBER STACKER

(71) Applicant: Kevin Troesser, Fulton, MO (US)

(72) Inventor: Kevin Troesser, Fulton, MO (US)

( * ) Notice: Subject to any disclaimer, the term of this patent is extended or adjusted under 35 U.S.C. 154(b) by 0 days.

(21) Appl. No.: 16/734,748

(22) Filed: Jan. 6, 2020

Related U.S. Application Data

(63) Continuation of application No. 15/916,789, filed on Mar. 9, 2018, now abandoned.

(60) Provisional application No. 62/469,119, filed on Mar. 9, 2017.

(51) Int. Cl.
 B65G 57/18 (2006.01)
 B65G 57/32 (2006.01)

(52) U.S. Cl.
 CPC .............. B65G 57/18 (2013.01); B65G 57/32 (2013.01); *B65G 2201/0282* (2013.01)

(58) Field of Classification Search
 CPC . B65G 57/18; B65G 57/32; B65G 2201/0282
 USPC ............... 414/754, 758, 789.3; 198/401, 402
 See application file for complete search history.

(56) References Cited

U.S. PATENT DOCUMENTS

| | | | |
|---|---|---|---|
| 310,232 A | 1/1885 | Smith | B65G 57/18 |
| 944,946 A | 12/1909 | Clark | B65G 57/18 |
| 978,565 A | 12/1910 | Denison | A01C 9/06 |
| 1,006,902 A | 10/1911 | Bickerton | 198/801 |
| 1,567,153 A | 12/1925 | Kelly | F26B 15/085 |
| 2,416,050 A | 2/1947 | Franklin | B65G 47/57 |
| 2,664,992 A | 1/1954 | Bahney | B65G 47/252 |
| 3,306,427 A | 2/1967 | Spencer | B65G 47/252 |
| 4,460,304 A | 7/1984 | Dombach | B65G 57/08 |
| 4,552,350 A | 11/1985 | Nagy et al. | B65H 5/22 |
| 4,618,302 A | 10/1986 | Kokubo et al. | B65H 29/40 |
| 4,645,400 A | 2/1987 | Mally et al. | B65H 31/40 |
| 4,795,297 A | 1/1989 | Tokuno et al. | B65G 59/08 |
| 4,936,437 A | 6/1990 | Gearhart | B65G 47/252 |
| 4,945,797 A | 8/1990 | Hahn | B23D 59/008 |
| 4,967,898 A | 11/1990 | Muller et al. | B65G 15/00 |
| 5,160,558 A | 11/1992 | Gardener | B32B 35/00 |
| 5,665,197 A | 9/1997 | Fuji et al. | B32B 31/00 |
| 5,979,634 A | 11/1999 | Odegard et al. | B65G 29/00 |
| 6,048,165 A | 4/2000 | Karhumaki | B65G 57/081 |
| 7,695,240 B2 | 4/2010 | Ghosh et al. | B65G 47/30 |
| 2005/0120840 A1 | 6/2005 | Koskovich | B23D 59/001 |
| 2008/0069681 A1 | 3/2008 | Halper et al. | B65G 57/22 |
| 2015/0344235 A1 | 12/2015 | Barone | B65B 27/10 |
| 2017/0088370 A1 | 3/2017 | Dion | B65G 57/081 |

*Primary Examiner* — Lynn E Schwenning
(74) *Attorney, Agent, or Firm* — Jonathan A. Bay

(57) ABSTRACT

A dimensional lumber stacker takes on plural boards in successive events from a feed group on one side of itself and then turns plural boards in unison about a horizontal axis and deposits them one the other side of itself, onto a deck. After which, the boards are urged away from the dimensional lumber stacker and across the deck as a unit, thereby separating from the dimensional lumber stacker and forming a stack as a consequence.

16 Claims, 10 Drawing Sheets

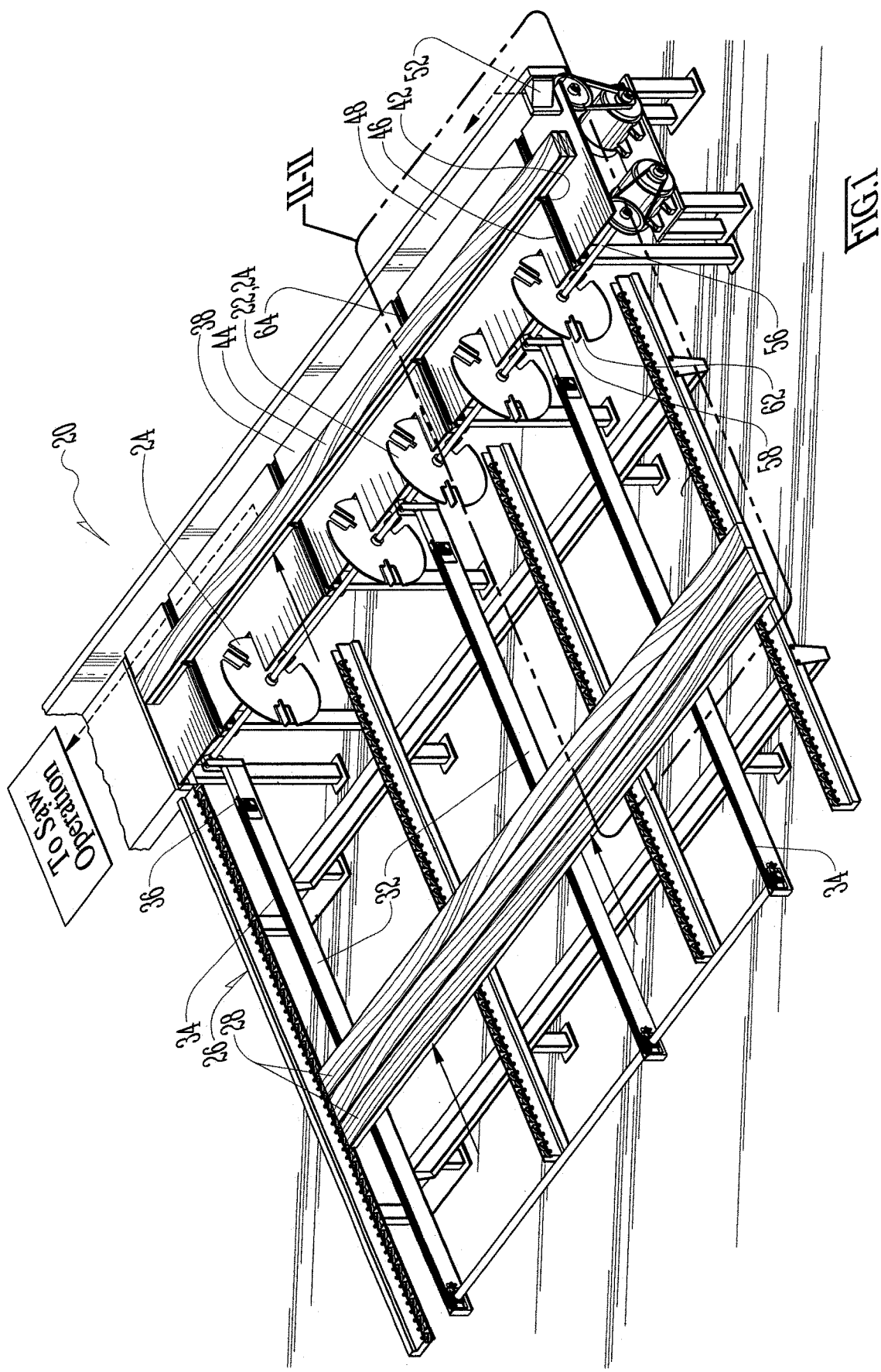

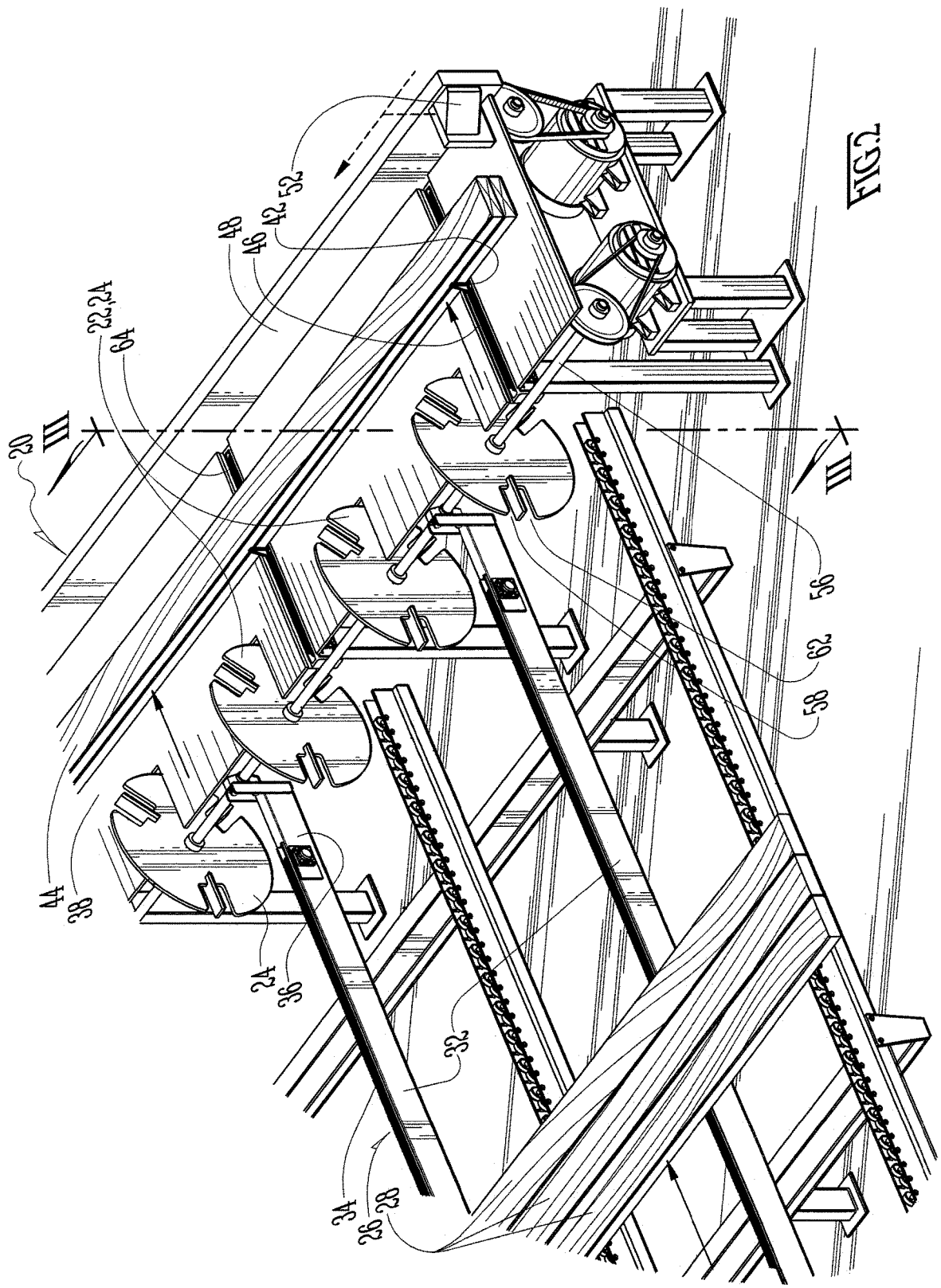

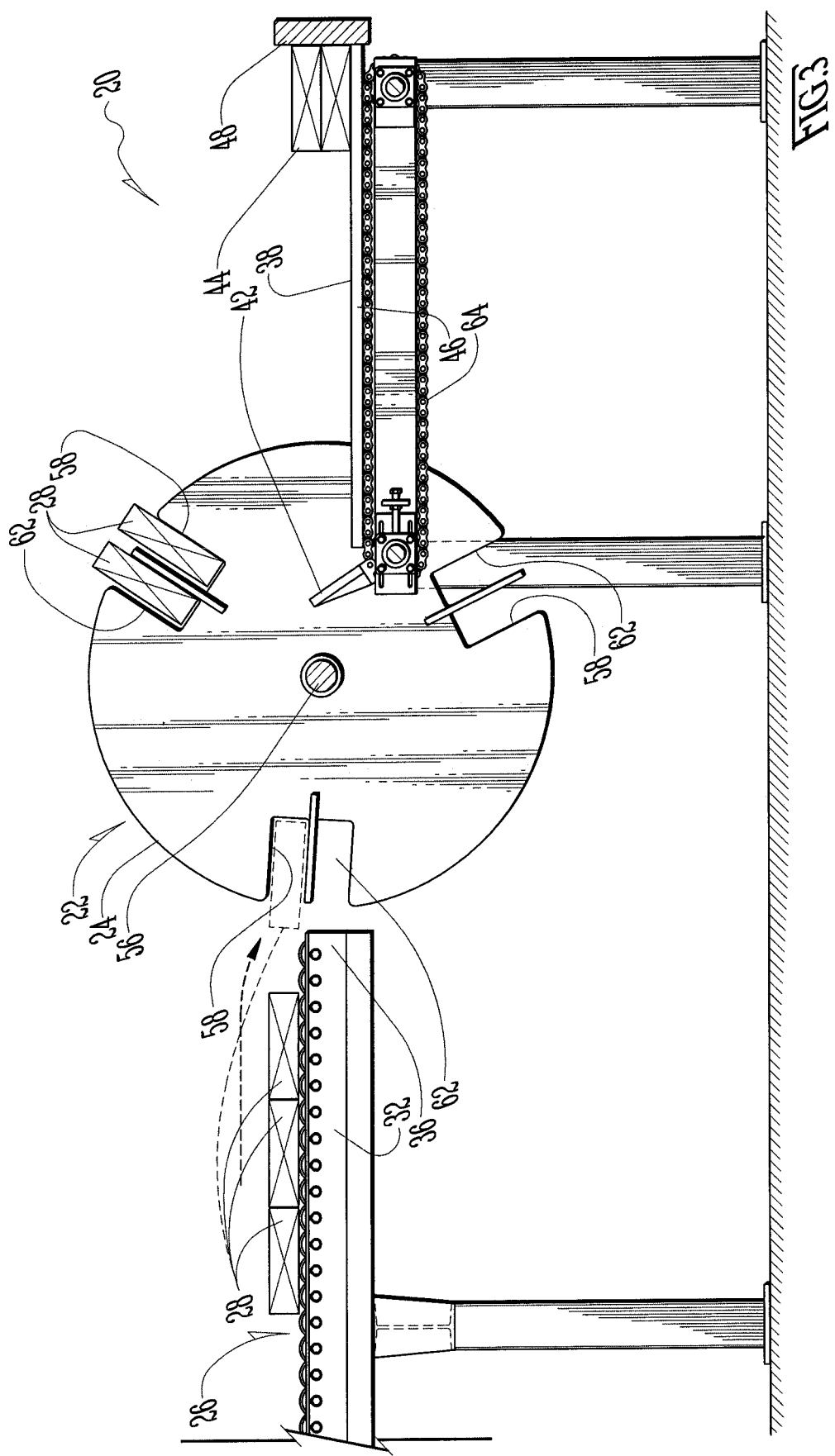

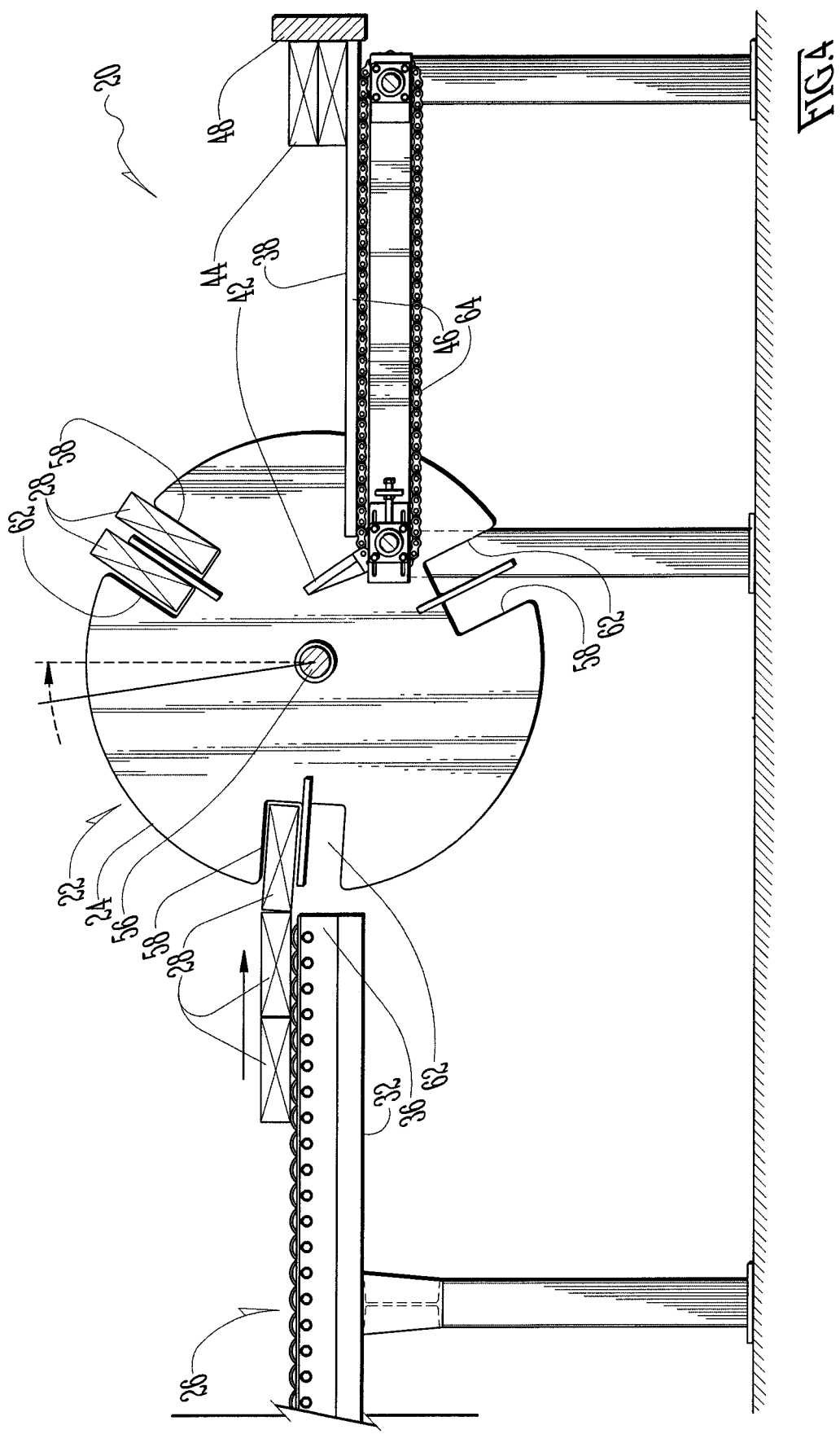

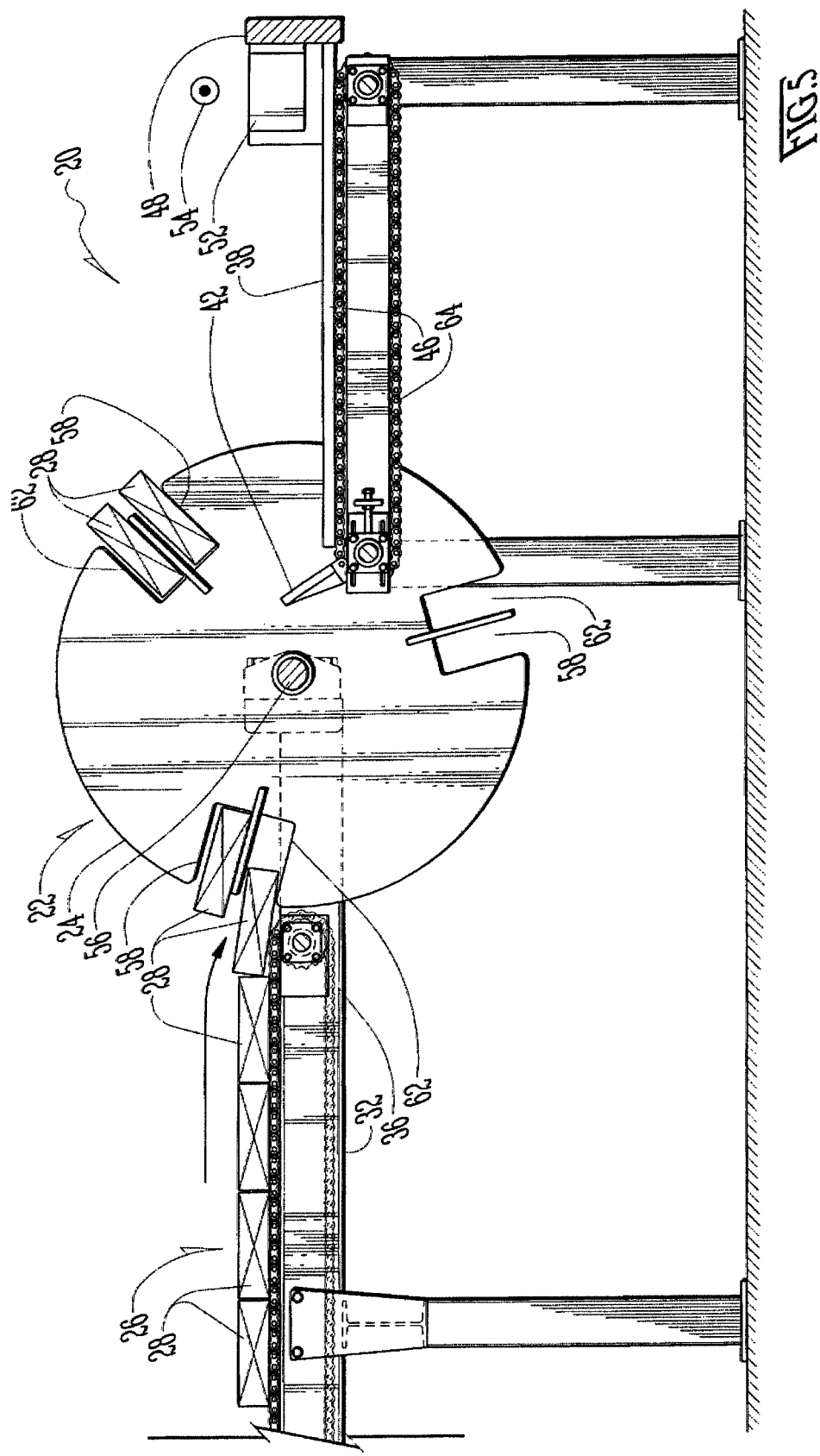

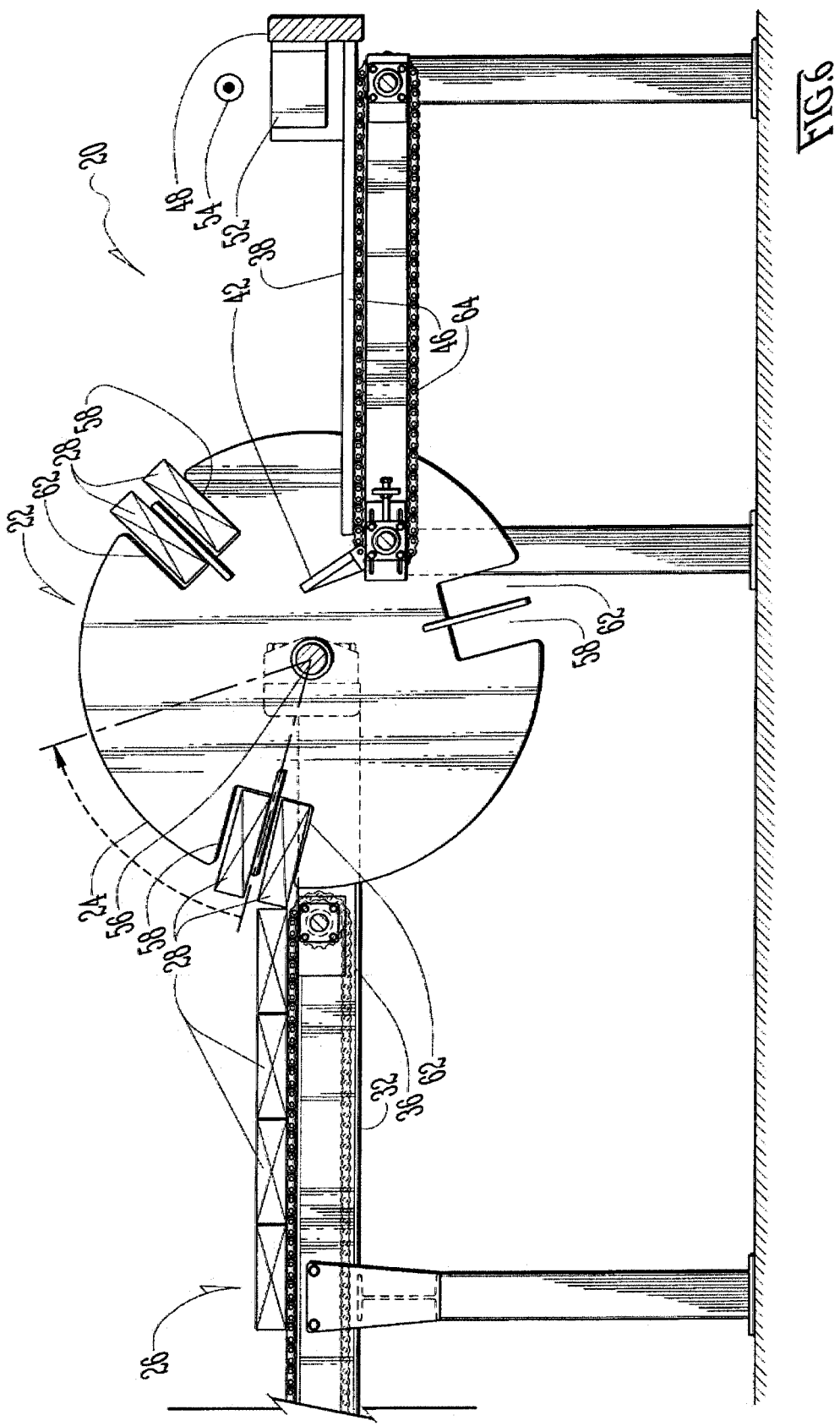

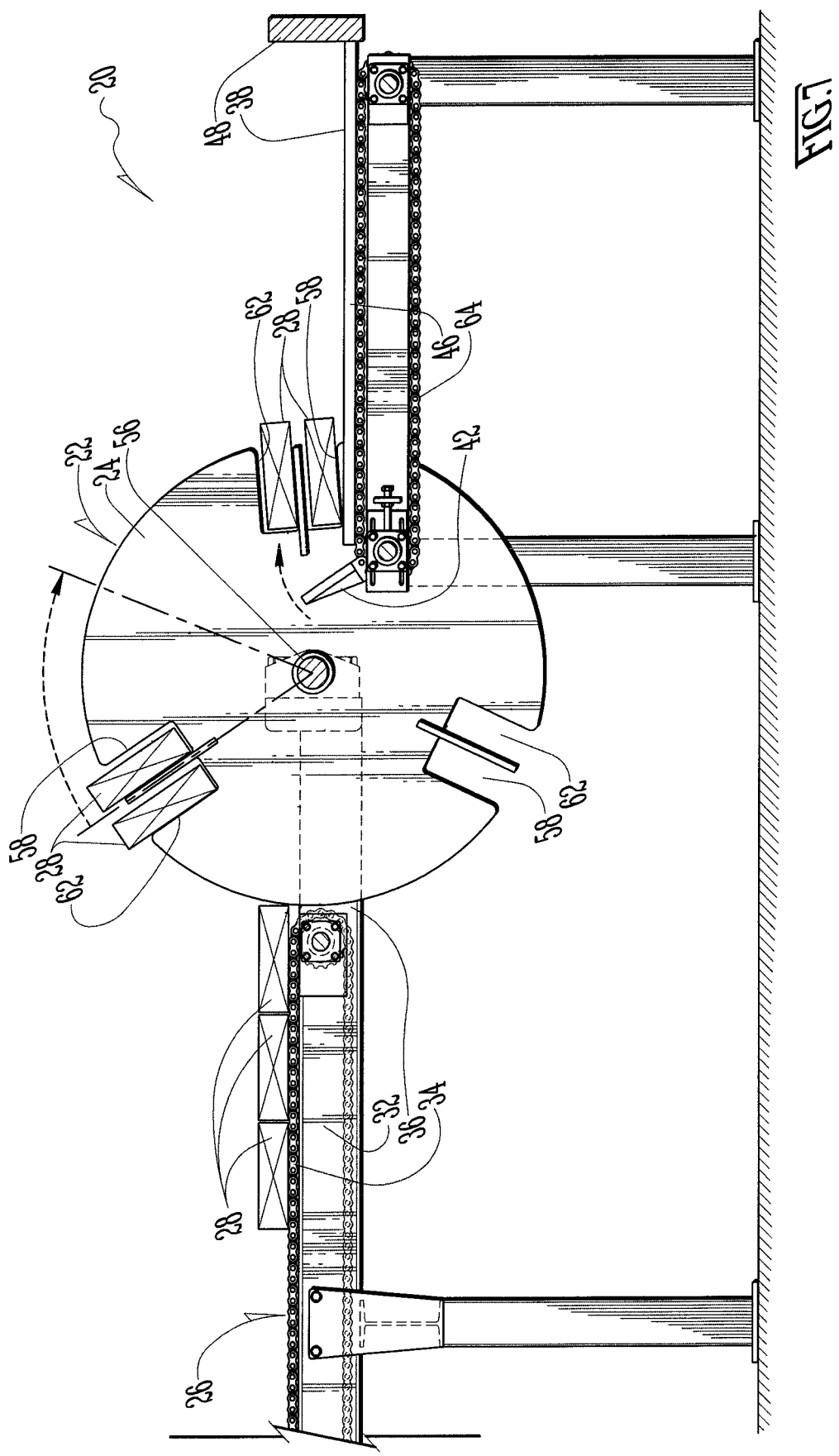

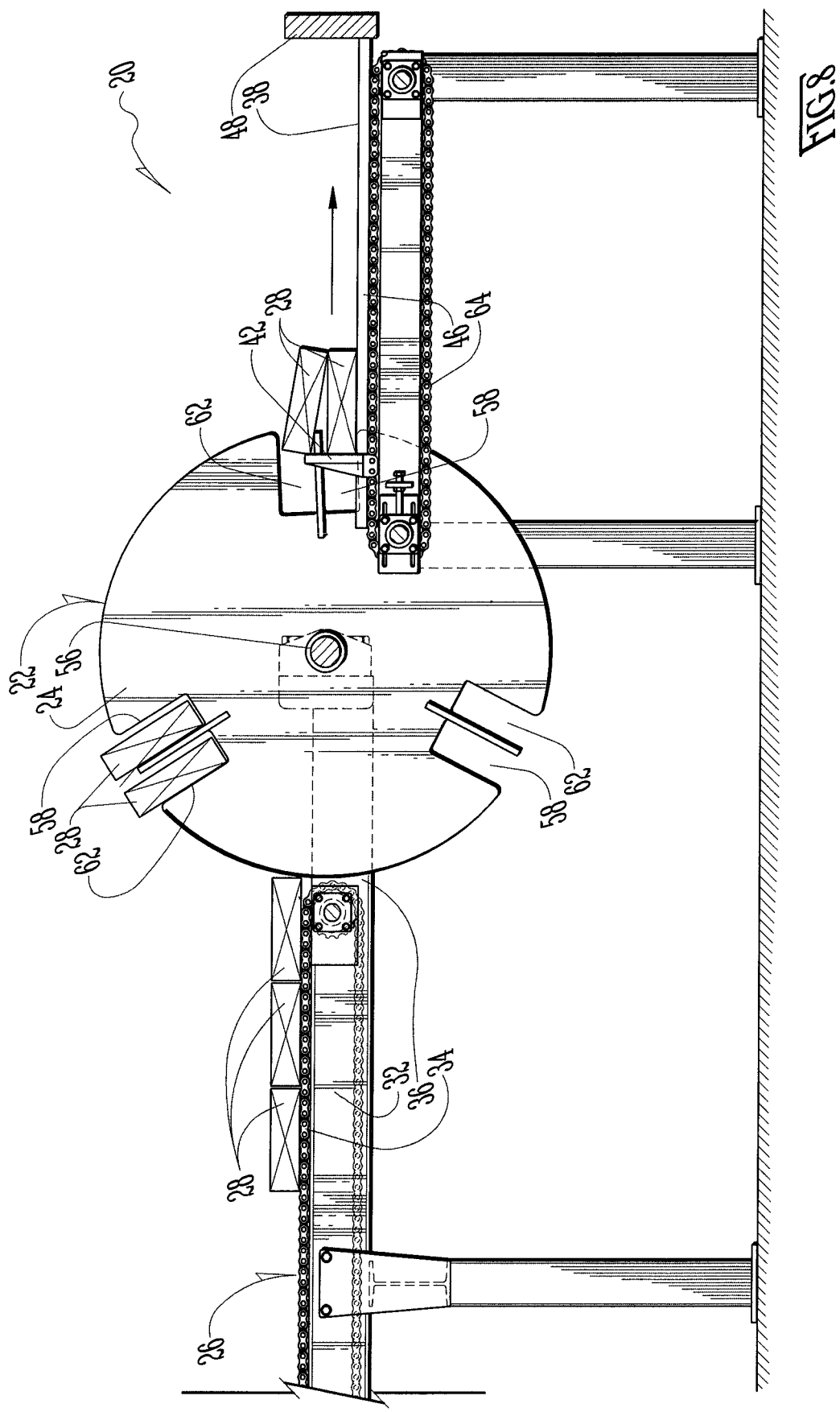

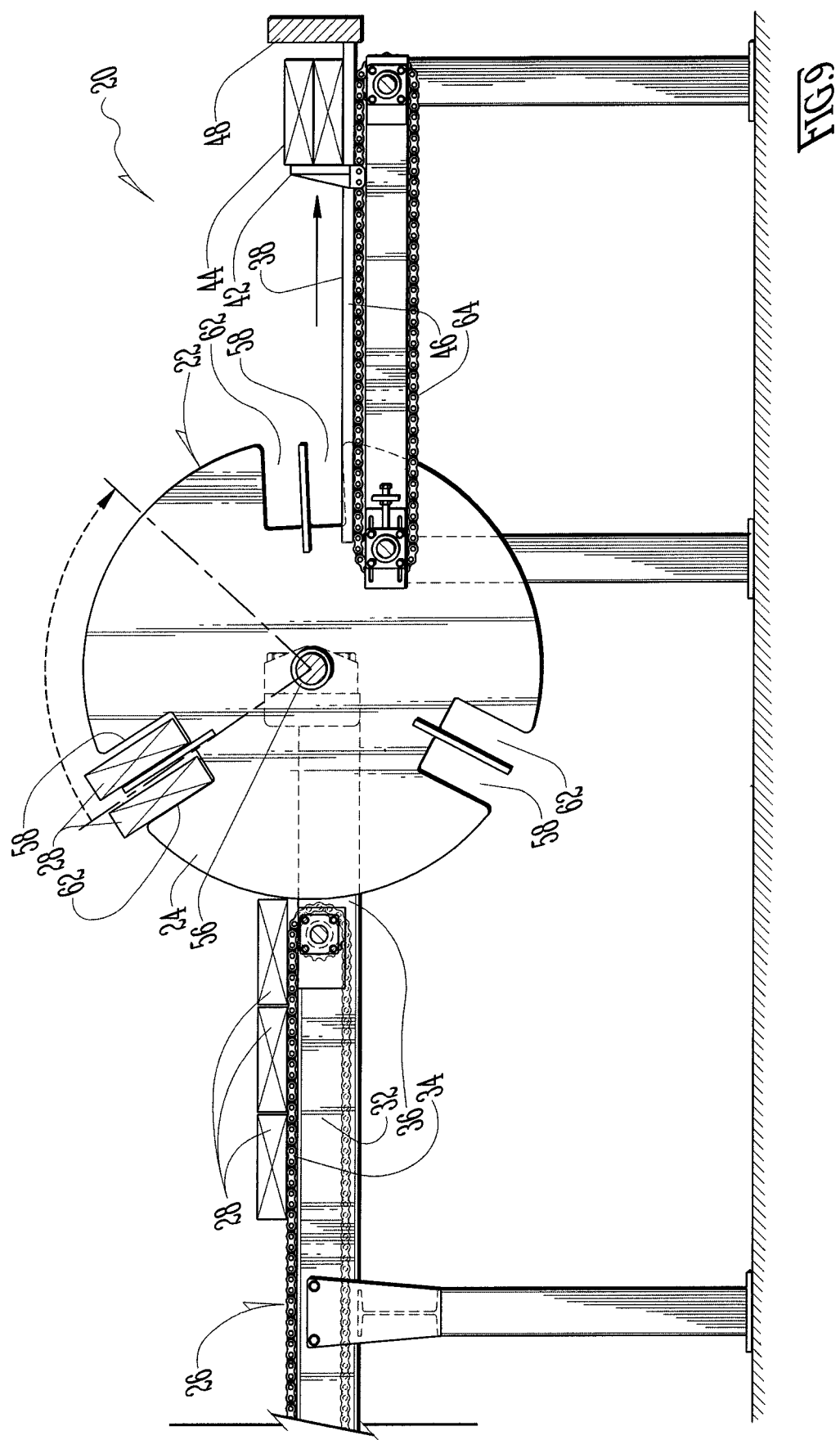

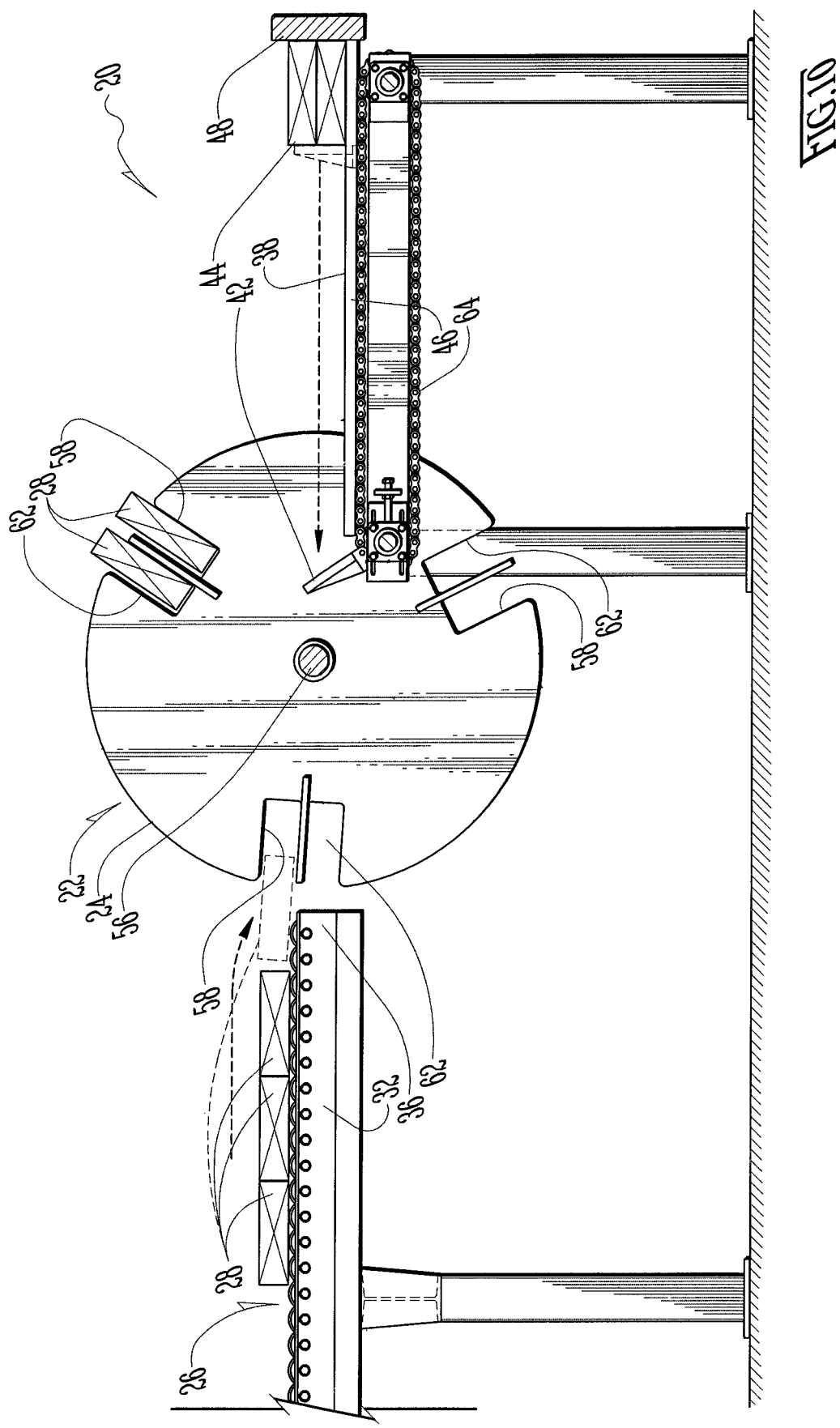

DIMENSIONAL LUMBER STACKER

CROSS-REFERENCE TO PROVISIONAL APPLICATION(S)

This application is a continuation of U.S. patent application Ser. No. 15/916,789, filed Mar. 9, 20108, which claims the benefit of U.S. Provisional Application No. 62/469,119, filed Mar. 9, 2017. The foregoing patent disclosure(s) are incorporated herein by this reference thereto.

BACKGROUND AND SUMMARY OF THE INVENTION

The invention relates to stack forming apparatus and, more particularly, to apparatus which takes articles for the stack from a feed group and turns the article about a horizontal axis. More particularly still, the stacking apparatus turns plural articles as a unit about a horizontal axis.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings, FIG. 1 is a perspective view of a dimensional lumber stacker in accordance with the invention (wherein, throughout the drawings, solid line arrows indicate present movement and dashed line arrows indicate future movement);

FIG. 2 is an enlarged-scale perspective view of detail II-II in FIG. 1;

FIG. 3 is an enlarged-scale side elevational view, partly in section, taken along line III-III in FIG. 2, and showing a feed conveyor loaded with an inflow of boards for feeding into empty slots of a pinwheel assembly, wherein the present lead board (its future position in FIG. 4 is indicated here in FIG. 3 in dashed lines) will be loaded into the upper empty slot of a pair of empty slots that are—at this instance—open to the discharge end of the feed conveyor (eg., that are dialed to the about 9 o'clock position on an imaginary clock dial given this vantage point);

FIG. 4 is a side elevational view comparable to FIG. 3 except showing that the present lead board (as indicated now in solid lines) is indeed loaded into the upper empty slot of the pair of slots that are open to the discharge end of the feed conveyor (eg., that are dialed to the about 9 o'clock position), and furthermore showing that the pinwheel assembly is preparing to index (rotate, or more particularly, make a step rotation) over a small angular arc, so that the lower empty slot will rotate up about 9° or so (clockwise in this view);

FIG. 5 is a side elevational view comparable to FIG. 4 except showing the feed conveyor feeding a succeeding lead board (indicated in solid lines) of the inflow of boards loaded on the feed conveyor into the lower empty slot of the pair of slots of the pinwheel assembly that are open to the discharge end of the feed conveyor (eg., that are now dialed to the about 9:30 clock angle);

FIG. 6 is a side elevational view comparable to FIG. 5 except showing the successive lead board is indeed loaded into the lower empty slot of the pair of slots of the pinwheel assembly that are open to the discharge end of the feed conveyor (eg., that are dialed to the about 9:30 clock angle), and furthermore showing the pinwheel assembly is preparing to index (rotate) over an intermediate angular arc, or such that the slots at the 9:30 clock angle will rotate up (eg., clockwise in this view) about 41°;

FIG. 7 is a side elevational view comparable to FIG. 6, except showing that the pinwheel assembly has rotated clockwise so far as to rest the first lead board in the pair of slots 120° ahead of the pair of slots that were just freshly fed in FIGS. 3-6 onto a saw deck that is more or less diametrically opposed across the pinwheel assembly from the discharge end of the feed conveyor, and furthermore showing that the one dog in view of a series of pushing dogs is about to move from its home position to push the pair of boards deposited by the pinwheel assembly on the inboard edge (or near edge) of the saw deck across the saw deck to the outboard edge bounded by a fence, wherein the pair of slots that were just freshly fed in FIGS. 3-6 are held idle and aloft at about an 11 o'clock position;

FIG. 8 is a side elevational view comparable to FIG. 7, except showing the pusher dog (again, it being one of a series) urging the stack by the inboard edges thereof to traverse outboard across the saw deck toward the spaced away fence at the far edge of the saw deck;

FIG. 9 is a side elevational view comparable to FIG. 8, except showing the stack just about to hit the fence, and furthermore showing that the pinwheel assembly is preparing to index (rotate) over a large angular arc, or such that the slots at the 11:00 position rotate over center (eg., clockwise in this view) about 70°; and FIG. 10 is a side elevational view comparable to FIG. 9, except showing the stack that was traversing the saw deck is now pushed up against and will be left in place against the fence, with the pusher dog retracting back in a full retraction stroke to its home position, and with the pair of slots that were just freshly fed in FIGS. 3-6 held idle and aloft at roughly a 1:00 o'clock position, wherein the pinwheel assembly has completed 120° 's of rotation so far, and the sequence of events from FIGS. 3 through 10 repeats the same over the next 120° 's of rotation, wherein pairs of slots in FIG. 10 are distributed around the imaginary clock dial are just exactly the same as in FIG. 3, except everything is 120° ahead.

DETAILED DESCRIPTION OF THE PREFERRED EMBODIMENTS

FIGS. 1-3 show a dimensional lumber stacker 20 in accordance with the invention. In the center of each view is a pinwheel assembly 22. As will be described more particularly below, the pinwheel assembly 22 will rotate (from the vantage point of all the drawings, the rotation will be clockwise) in three (3) indexes (eg., step rotations) every 120° of rotation. That is, this dimensional lumber stacker 20 in accordance with the invention has a repetitive sequence of events that repeats every 120° of pinwheel assembly 22 rotation. As will be explained more particularly below, the pinwheel assembly 22 has features which repeat every 120° around the periphery of each disk 24 of the pinwheel assembly 22.

In the foreground in FIGS. 1 and 2, relative to the pinwheel assembly 22, there is a feed conveyor 26 carrying a load of boards 28 of dimensional lumber in edge-to-edge alignment. By way of example and without limitation, these are 2×6 boards of lumber (in nominal inches) that are about 16 feet long. The boards 28 on the feed conveyor 26 are not stacked. Each of the boards 28 lies flat on a 6 inch side, and is edge-to-edge by the 2 inch sides with adjacent boards 28. Also, the longitudinal axis of the boards 28 extends laterally left and right across the deck 38 of the feed conveyor 26. The feed conveyor 26 feeds the boards 28 one at a time into the pinwheel assembly 22.

The feed conveyor 26 comprises (by way of example and not limitation) a series of laterally spaced parallel bunks 32, some of which can be passive, and at least others of which are provided with conveying provisions. As shown in the drawings, the preferred conveying provisions include selected ones of the bunks 32 being provided with an endless chain 34 stretched between a sprocket at the discharge end and a spaced away return sprocket. The chain 34 will have an upper board carrying run and lower return run.

Diametrically opposite across the pinwheel assembly 22 from the discharge end of the feed conveyor 26, there is a saw deck 38 for receiving the deposit of boards 28 stacked by the pinwheel assembly 22 on the inboard edge of the saw deck 38. FIG. 3 shows better one dog 42 of a series of laterally spaced pusher dogs 42 residing in a home position inboard of where the pinwheel assembly 22 will deposit the stack 44 deposited on the inboard edge of the saw deck 38. FIG. 1 shows four slots 46 across the saw deck 38 for four such pusher dogs 42, which are too diminutive themselves in FIG. 1 to discern. That way, there can be a pusher dog 42 aligned on the outside of the outermost of the five disks 24 of the pinwheel assembly 22, and then two more pusher dogs 42 in the lanes between disks 24. As shown in FIGS. 7 through 10, the dog(s) 42 will push the stack 44 from the inboard edge to over against the fence 48, and leave the stack 44 there.

FIGS. 1 and 2 show better a shuttle 52 residing in its home position but which runs in extension and retraction strokes along the fence 48, left and right respectively given the vantage point of those views.

Given the cutting plane for FIGS. 3-10 taken along line III-III in FIG. 2, if the shuttle 52 is not shown in any one of those views, that means that the shuttle 52 is in a plane (actually, in these views, in the plane of its home position) that is outside the plane of the FIGS. 3-10 and spaced towards us, the viewers. In FIGS. 5 and 6 where the shuttle 52 is illustrated, the shuttle 52 is accompanied by a conventional symbol 54 for vectors which either point into the page or out of the page. In both views, the shuttle 52 is moving away from us, the viewers. Hence the conventional vector symbol 54 for this motion is a ring surrounding a dark circle. This vector symbol 54 convention is more typical of electric circuit diagrams, for indicating the direction of current in the cross section of an electric wire.

In any event, as FIG. 1 indicates, the shuttle 52 pushes the stack 44 that was left in place against the fence 48 down line to a saw, or a mill, or other operations that are not shown in the views. The inspiration behind this invention includes truss making, stair stringer making and the like. As will be shown in later views, the pinwheel assembly 22 will stack two boards 28 in a stack 44 on the near edge of the saw deck 38. And again as will be shown in later views, a series of pusher dogs 42 (eg., see FIG. 3) (eg., pushing pins) will push that stack 44 across the deck 38 from the near edge to the far edge and leave the stack 44 there deposited against the fence 48.

The pinwheel assembly 22 comprises an elongated shaft 56 outfitted with a series of axially spaced disks 24 (eg., five in number as shown in FIG. 1). Each disk 24 has its circular periphery recessed with six (6) radially recessed slots 58,62.

Actually, each disk 24 is notched with three radially recessed notches which are partitioned by spokes to form the three pair of angularly spaced slots 58,62. Again, the slots 58,62 are grouped in three pairs. The pairs are spaced angularly apart 120° around each disk 24. Each slot 58,62 is sized for receiving a board 28 of dimensional lumber by an edge or a side thereof. It is preferred that the slots 58,62 are sized to receive the boards 28 by the edges. Since the edges of these boards 28 are nominally 2 inches thick, the slots 58,62 are sized for receiving a board 28 with the nominal 2 inch edge being inserted therein. That way, the pinwheel assembly 22 can handle 2×4's, 2×6's, 2×8's and so on.

The saw deck 38 can comprise any suitable substrate. The dogs 42 are driven by chain drives 64 disposed below the substrate of the saw deck 38.

Pause can be taken to introduce the foregoing description of FIGS. 3-10. All are side elevation views taken along the cutting line III-III in FIG. 2 (and all are partly in section). All show some change in the sequence of events among the following four items over a representative 120° arc rotation of the pinwheel assembly 22, after which the sequence repeats. Those items are, namely:— the feed conveyor 26;

the pinwheel assembly 22;

the pusher dogs 42, and the downline shuttle 52.

FIG. 3 shows the a feed conveyor 26 loaded with an inflow of boards 28 for feeding into empty slots 58,62 of the pinwheel assembly 22. The present lead board 28 (its future position in FIG. 4 is indicated here in FIG. 3 dashed lines) will be loaded into the upper empty slot 58 of the pair of empty slots 58,62 that are (at this instance) open to the discharge end of the feed conveyor 26. In other words, these pair of slots 58,62 are dialed to the about 9 o'clock position on an imaginary clock dial (given this vantage point).

FIG. 3 also shows that the pair of slots 58,62 120° ahead of the pair of slots 58,62 open to the discharge end of the feed conveyor 26 are loaded with one board apiece, and are held aloft (and not moving) at the about 1 o'clock position. FIG. 3 furthermore shows a stack 44 (of two boards 28) pushed across the saw deck 38 and left in place up against the fence 48.

The state of things in FIG. 3 are thus:—

TABLE

| | FIG. 3 |
|---|---|
| Item | State |
| Feed conveyor 26 | Active - ie., forwardly conveying boards 28 |
| Pinwheel assembly 22 | Idle |
| Pusher dogs 42 | Idle - and residing in home position therefor |
| Shuttle 52 | Idle - and residing in home position therefor |

FIG. 4 is comparable to FIG. 3 except showing that the present lead board 28 (as indicated now in solid lines) is indeed loaded into the upper empty slot 58 of the pair of slots 58,62 that are open to the discharge end of the feed conveyor 26 (eg., that are dialed to the about 9 o'clock position). FIG. 4 furthermore shows that the pinwheel assembly 22 is preparing to index (rotate) over a small angular arc, so that the lower empty slot 62 will rotate up about 9° or so (clockwise in this view), as indicated by a dashed line arc arrow.

The state of things in FIG. 4 are thus:—

TABLE

FIG. 4

| Item | State |
|---|---|
| Feed conveyor 26 | Preparing to halt and idle |
| Pinwheel assembly 22 | Idle |
| Pusher dogs 42 | Idle - and residing in home position therefor |
| Shuttle 52 | Idle - and residing in home position therefor |

FIG. 5 is comparable to FIG. 4 except showing that the pinwheel assembly 22 has finally rotated a bit. The pinwheel assembly 22 has rotated a small arc angle as indicated in FIG. 4 (about 9° clockwise), but is now idle. The feed conveyor 26 is feeding a succeeding lead board 28 (indicated in solid lines) of the inflow of boards 28 loaded that are loaded onto the feed conveyor 26 into the lower empty slot 62 of the pair of slots 58,62 of the pinwheel assembly 22 that are open to the discharge end of the feed conveyor 26 (eg., that are now dialed to the about 9:30 clock angle). Thus pinwheel assembly 22 has oriented the lower empty slot 62 (of the pair of slots 58,62 that now face the 9:30 clock angle) to receive the next lead board 28 from the feed conveyor 26. After this, both of the pair of slots 58,62 that now face the 9:30 clock angle are loaded with one board apiece, and the feed conveyor 26 will halt and idle again.

FIG. 5 furthermore shows the shuttle 52 for the first time since last seen in FIGS. 1 and 2. The shuttle 52 is pushing the stack 44 shown in FIG. 4 resting against the fence 48 as now being propelled away from us, the viewers, and into the depth of the page. Again, this is indicated by a conventional vector direction symbol 54 for vectors illustrated in cross-section (ie., a ring surrounding a dark circle).

The state of things in FIG. 5 are thus:—

TABLE

FIG. 5

| Item | State |
|---|---|
| Feed conveyor 26 | Active but just about to halt and idle again |
| Pinwheel assembly 22 | Quiet now after just having indexed |
| Pusher dogs 42 | Idle - and residing in home position therefor |
| Shuttle 52 | Active - pushing the stack 44 away downline |

FIG. 6 is comparable to FIG. 5 except showing that the successive lead board 28 is indeed loaded into the lower empty slot 62 of the pair of slots 58,62 of the pinwheel assembly 22 that are open to the discharge end of the feed conveyor 26 (eg., that are dialed to the about 9:30 clock angle). FIG. 6 furthermore shows that the pinwheel assembly 22 is preparing to index (rotate) over an intermediate angular arc, or such that the slots 58,62 at the 9:30 clock angle will rotate up (eg., clockwise in this view) about 41°.

The state of things in FIG. 6 are thus:—

TABLE

FIG. 6

| Item | State |
|---|---|
| Feed conveyor 26 | Idle |
| Pinwheel assembly 22 | Idle |

TABLE-continued

FIG. 6

| Item | State |
|---|---|
| Pusher dogs 42 | Idle - and residing in home position therefor |
| Shuttle 52 | Active - pushing the stack 44 away downline |

FIG. 7 is comparable to FIG. 6 except showing that the pinwheel assembly 22 has rotated clockwise so far as to rest the first lead board 28 in the pair of slots 58,62 120° ahead of the pair of slots 58,62 that were just freshly fed in FIGS. 3-6 onto the saw deck 38 that is more or less diametrically opposed across the pinwheel assembly 22 from the discharge end of the feed conveyor 26. FIG. 7 furthermore shows that the one dog 42 in view (representative of the series of pushing dogs 42) is about to move from its home position to push the pair of boards 28 deposited on the inboard edge of the saw deck 38 by the pinwheel assembly 22 traverse across the saw deck 38 to the outboard edge bounded by a fence 48. The pair of slots 58,62 that were just freshly fed in FIGS. 3-6 are held idle and aloft at about an 11:00 o'clock position.

FIG. 7 also shows that the shuttle 52 has completed its stroke because, while this is not discernible in the view, it is now idle in its home position and thereby not shown in FIG. 7.

The state of things in FIG. 7 are thus:—

TABLE

FIG. 7

| Item | State |
|---|---|
| Feed conveyor 26 | Idle |
| Pinwheel assembly 22 | Quiet now after just having indexed |
| Pusher dogs 42 | Active - about to abut inboard edges of the stack 44 |
| Shuttle 52 | Idle - and residing in home position therefor |

FIG. 8 is comparable to FIG. 7, except showing the single pusher dog 42 in the view (again, it being one of a series) urging the stack 44 by the inboard edges thereof to traverse outboard across the saw deck 38 toward the spaced away fence 48 at the far edge of the saw deck 38.

The state of things in FIG. 8 are thus:—

TABLE

FIG. 8

| Item | State |
|---|---|
| Feed conveyor 26 | Idle |
| Pinwheel assembly 22 | Idle |
| Pusher dogs 42 | Active - ie., actively extending across the deck 38 |
| Shuttle 52 | Idle - and residing in home position therefor |

FIG. 9 is comparable to FIG. 8, except showing the stack 44 just about to hit the fence 48, and furthermore showing that the pinwheel assembly 22 is preparing to index (rotate) over a large angular arc, or such that the slots 58,62 at the 11:00 position will rotate over center (eg., clockwise in this view) about 70°, which will coordinate with the dogs 42 being in full retraction during that rotation.

The state of things in FIG. 9 are thus:—

TABLE

| FIG. 9 | |
| --- | --- |
| Item | State |
| Feed conveyor 26 | Idle |
| Pinwheel assembly 22 | Idle |
| Pusher dogs 42 | Active - ie., actively extending across the deck 38 |
| Shuttle 52 | Idle - and residing in home position therefor |

FIG. 10 is comparable to FIG. 9 except showing the stack 44 that was traversing the saw deck 38 is now pushed up to and left in place against the fence 48, and with the pusher dog 42 having retracted back in a full retraction stroke to its home position. The pair of slots 58,62 that were just freshly fed in FIGS. 3-6 are being held idle and aloft at roughly a 1:00 o'clock position, wherein the pinwheel assembly 22 has completed 120° 's of rotation so far, and the sequence of events from FIGS. 3 through 10 repeats over the next 120° 's of rotation, wherein the pairs of slots 58,62 in FIG. 10 as distributed around the imaginary clock dial are just exactly the same as in FIG. 3, except everything is 120° ahead.

The state of things in FIG. 10 are thus:—

TABLE

| FIG. 10 | |
| --- | --- |
| Item | State |
| Feed conveyor 26 | Active - ie., forwardly conveying boards 28 |
| Pinwheel assembly 22 | Quiet now after just having indexed |
| Pusher dogs 42 | Idle - and residing in home position therefor |
| Shuttle 52 | Idle - and residing in home position therefor |

It is an aspect of the invention that, the boards 28 are not stacked at the instance of the intake of the plural boards 28 by the pinwheel assembly 22. The boards 28 are stacked when deposited on the near edge of the deck 38 about 180° apart from the intake position for the pinwheel assembly 22.

Whereas the invention has been disclosed in connection with a two-high stack 44 of boards 28, the invention could be alternatively configured for stack 44 of three or more boards 28. And whereas the invention has been disclosed such that each empty slot of the pinwheel assembly 22 is loaded at every instance, it could be a choice by a controller or user to load fewer than all the empty slots 58,62. That is, where a run of stacked boards 28 call for the same saw operation on eleven boards 28, five pairs of two-high stacked boards 28 will be sent to the saw operation, and then one lone eleventh board, before boards 28 are sent again stacked two-high except for a new saw operation. And further whereas the disks 24 of the pinwheel assembly 22 are symmetric every 120° (ie., the repeating pattern of the disks 24 is divided in three wedges), the disks 24 can be both divided into any number of wedges from none to many, and, there need not be any symmetry.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A method of forming a stack of "n" boards of dimensional lumber on a rest, from which the stack will be moved away to other saw or mill operations; said method comprising the steps of:
    providing a multiplicity of boards of dimensional lumber, each board being elongated between spaced ends and having flat sides of width "w" being spaced by spaced edges of thickness "t;"
    providing a pinwheel assembly having a plurality of spaced disks mounted on a common shaft;
    disposing the pinwheel assembly between a loading station on one side of a vertical plane containing the shaft and the rest on the other side;
    recessing each disk's periphery with a notch having an inboard-side edge flanked between spaced side edges that extend to the periphery and spacing the side edges proximate "n" times "t" apart, wherein the notch of each disk is axially aligned with the notches of the other disks;
    orienting the alignment of notches of the pinwheel assembly relative to the loading station to a home position;
    loading a present lead board into the alignment of notches with one edge of the board abutting the alignment of notches' inboard-side edges;
    repetitiously indexing the pinwheel assembly a small angular arc and thereafter loading a next lead board into the alignment of notches until "n" boards are loaded into the alignment of notches;
    indexing the pinwheel assembly a large angular arc where the alignment of notches are oriented relative to the rest to a deposit position, whereby the load of "n" boards are rotated over center of the shaft of the pinwheel assembly;
    urging the "n" boards out of the alignment of notches to form a stack on the rest.

2. The method of claim 1, further comprising:
    after the step of urging, returning the pinwheel assembly to the home position.

3. The method of claim 1, wherein:
    "t" is proximate a nominal 2 inches; and
    "w" is proximate any of a nominal 4 inches, 6 inches or more.

4. The method of claim 1, wherein:
    the plurality of disks are axially spaced apart on the shaft of the pinwheel assembly to be capable of carrying "n" boards over the center of the shaft of the pinwheel assembly where the boards are elongated along an axial length "L" that is proximate 16 feet.

5. The method of claim 1, wherein:
    "n" equals 2; and
    further comprising:—
        partitioning the notch into two slots by a spoke lying on a diametrical vector out of the center of the shaft of the pinwheel assembly.

6. The method of claim 5, wherein the disks of the pinwheel assembly are recessed with one alignment of notches according to the method of claim 1, further comprising:
    recessing each disk's periphery with another notch and an additional notch, wherein the other notch of each disk is axially aligned with the other notches of the other disks and the additional notch of each disk is axially aligned with the additional notches of the other disks; and
    angularly disposing 120° apart the one alignment of notches, the other alignment of notches and the additional alignment of notches.

7. The method of claim 6, further comprising:
disposing the one alignment of notches 120° rotationally ahead of the other alignment of notches and 240° rotationally ahead of the additional alignment of notches relative the direction of rotation where the one alignment of notches rotate over center from the loading station to the rest; and
wherein the steps of orienting, loading, indexing and urging collectively further comprise:
step 1:
orienting the one alignment of notches of the pinwheel assembly relative to the loading station to a home position;
step 2:
loading the present lead board into one of the alignment of slots of the one alignment of notches;
step 3:
indexing the pinwheel assembly a small angular arc;
step 4:
loading the next present lead board into the other alignment of slots of the one alignment of notches;
step 5:
indexing the pinwheel assembly through an intermediate angular arc, thereby rotating the one alignment of notches up toward but not over center while orienting the boards, if any, loaded into the additional alignment of notches relative to the rest to a deposit position;
step 6:
idling the pinwheel assembly while not only holding aloft the boards loaded into the one alignment of notches but also urging out the boards, if any, loaded into the additional alignment of notches to form a stack on the rest; and
step 7:
indexing the pinwheel assembly through a large angular arc, thereby orienting the other alignment of notches of the pinwheel assembly to the home position relative to the loading station.

8. The method of claim 7, wherein the steps 1 through 7 according to the method of claim 1 comprise a Cycle A, further comprising:
Cycle B:
repeating steps 1 through 7 according to claim 1 except:
substituting the other alignment of notches for the place of the one alignment of notches;
substituting the one alignment of notches for the place of the additional alignment of notches; and
substituting the additional alignment of notches for the place of the other alignment of notches;
Cycle C:
repeating steps 1 through 7 according to claim 1 except;
substituting the additional alignment of notches for the place of the one alignment of notches;
substituting the other alignment of notches for the place of the additional alignment of notches; and
substituting the one alignment of notches for the place of the other alignment of notches; and
repeating Cycles A through C for an indefinite run.

9. A method of forming a stack of "n" boards of dimensional lumber on a rest, from which the stack will be moved away to other saw or mill operations; said method comprising the steps of:
providing a multiplicity of boards of dimensional lumber, each board being elongated between spaced ends and having flat sides of width "w" being spaced by spaced edges of thickness "t;"
feeding the multiplicity boards on a generally planar infeed system wherein the flat sides are up and down, the edges are leading and trailing, and the ends are opposite from each other left to right;
providing a pinwheel assembly having a plurality of spaced disks mounted on a common shaft;
disposing the pinwheel assembly between a discharge end of the infeed system on one side of a vertical plane containing the shaft and the rest on the other side;
forming each disk's periphery with a notch having an inboard closed end flanked between spaced side edges that extend to the periphery and defining an outboard, peripheral open end as well as spacing the side edges proximate "n" times "t" apart, wherein the notch of each disk is axially aligned with the notches of the other disks;
coordinating feeding of the infeed system and indexing of the pinwheel assembly through small angular arcs such that "n" boards are loaded into the alignment of the notches with the leading edges abutting the inboard closed ends of the alignment of notches, wherein "n" is at least two;
indexing the pinwheel assembly through an angular arc greater than any small angular arc, thereby rotating the alignment of notches and boards loaded therein up and over center; and
depositing the boards in a stack "n" boards high on the rest.

10. The method of claim 9, further comprising:
moving the stack out of the alignment of notches and outboard to a conveying system for conveying the stack onwards to a saw or mill operation.

11. The method of claim 10, further comprising:
moving the stack up against a fence, and then laterally moving the stack towards the saw or mill operation.

12. The method of claim 11, wherein:
the saw or mill operation comprises milling or sawing to produce trusses or stringers.

13. A method of forming a stack of boards of dimensional lumber on a rest, from which the stack will be moved away to other saw or mill operations; said method comprising the steps of:
providing a pinwheel assembly have a plurality of spaced disks mounted on a common shaft;
forming each disk's periphery with a notch having an inboard closed end flanked between spaced side edges that extend to the periphery and defining an outboard, peripheral open end as well as spacing the side edges proximate "n" times "t" apart, wherein the notch of each disk is axially aligned with the notches of the other disks;
orienting the notches of the plurality of disks relative to a loading station;
loading one board into the notches of the plurality of disks;
repetitiously indexing the pinwheel assembly through small angular arcs and loading another board into the notches of the plurality of disks until "n" boards are loaded into the notches of the plurality of disks wherein "n" is two or more boards;
later, indexing the pinwheel assembly an angular arc greater than any small angular arc, thereby rotating the notches of the plurality of disks of the pinwheel assembly relative to the rest to deposit the "n" boards loaded therein onto the rest to form a stack "n" boards high.

14. The method of claim 13, further comprising:
moving the stack out of the alignment of notches and outboard to a conveying system for conveying the stack onwards to a saw or mill operation.
15. The method of claim 14, further comprising:
moving the stack up against a fence, and then laterally moving the stack towards the saw or mill operation.
16. The method of claim 15, wherein:
the saw or mill operation comprises milling or sawing to produce trusses or stringers.

* * * * *